(12) United States Patent
Koh et al.

(10) Patent No.: US 8,877,389 B2
(45) Date of Patent: Nov. 4, 2014

(54) LITHIUM SECONDARY CELL

(75) Inventors: Meiten Koh, Settsu (JP); Hideo Sakata, Settsu (JP); Hitomi Nakazawa, Settsu (JP); Hiroyuki Arima, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 367 days.

(21) Appl. No.: 13/002,004

(22) PCT Filed: Jun. 29, 2009

(86) PCT No.: PCT/JP2009/061835
§ 371 (c)(1),
(2), (4) Date: Dec. 29, 2010

(87) PCT Pub. No.: WO2010/001850
PCT Pub. Date: Jan. 7, 2010

(65) Prior Publication Data
US 2011/0111307 A1    May 12, 2011

(30) Foreign Application Priority Data

Jun. 30, 2008  (JP) ................................ 2008-171025

(51) Int. Cl.
*H01M 6/16*  (2006.01)
*H01M 4/13*  (2010.01)
*H01M 4/485*  (2010.01)
*H01M 10/0569*  (2010.01)
*H01M 10/052*  (2010.01)

(52) U.S. Cl.
CPC ............ *H01M 10/052* (2013.01); *Y02E 60/122* (2013.01); *H01M 4/485* (2013.01); *H01M 6/164* (2013.01); *H01M 10/0569* (2013.01); *Y02T 10/7011* (2013.01); *H01M 2300/0034* (2013.01); *H01M 2300/0025* (2013.01)
USPC ........... 429/326; 429/324; 429/338; 429/209; 429/231.95

(58) Field of Classification Search
None
See application file for complete search history.

(56) References Cited

U.S. PATENT DOCUMENTS

| | | | |
|---|---|---|---|
| 6,475,673 B1 * | 11/2002 | Yamawaki et al. | 429/231.5 |
| 2005/0147889 A1 | 7/2005 | Ohzuku et al. | |
| 2006/0204847 A1 | 9/2006 | Ohzuku et al. | |
| 2008/0145758 A1 | 6/2008 | Kim et al. | |
| 2008/0145763 A1 * | 6/2008 | Koh et al. | 429/342 |
| 2009/0086408 A1 * | 4/2009 | Koh et al. | 361/502 |
| 2009/0305144 A1 | 12/2009 | Koh et al. | |

FOREIGN PATENT DOCUMENTS

| | | |
|---|---|---|
| CN | 1614808 A | 5/2005 |
| CN | 101156216 A | 4/2008 |
| EP | 1039570 A1 | 9/2000 |
| EP | 1530248 A2 | 5/2005 |

(Continued)

OTHER PUBLICATIONS

I. Belharouak, et al.; "On the Safety of the $Li_4Ti_5O_{12}/LiMn_2O_4$ Lithium-Ion Battery System"; Journal of the Electrochemical Society; vol. 154, No. 12; Oct. 1, 2007; pp. A1083-A1087; XP055062557.

*Primary Examiner* — Barbara Gilliam
*Assistant Examiner* — Adam A Arciero
(74) *Attorney, Agent, or Firm* — Sughrue Mion, PLLC (57) ABSTRACT

There is provided a lithium secondary cell having specifically excellent discharge capacity, rate characteristics and further cycle characteristics and improved incombustibility (safety). The lithium secondary cell comprises a negative electrode, a non-aqueous electrolytic solution and a positive electrode, in which an active material for the negative electrode comprises lithium titanate and the non-aqueous electrolytic solution comprises a fluorine-containing solvent.

8 Claims, 1 Drawing Sheet

(56) References Cited

FOREIGN PATENT DOCUMENTS

| | | | |
|---|---|---|---|
| EP | 1923935 | A1 | 5/2008 |
| JP | 11-307120 | A | 11/1999 |
| JP | 2002-343424 | A | 11/2002 |
| JP | 2004-362872 | A | 12/2004 |
| JP | 2005-142047 | A | 6/2005 |
| JP | 2008-130560 | A | 6/2008 |
| KR | 10-0756169 | B1 | 9/2007 |
| WO | 2006/106655 | A1 | 10/2006 |
| WO | 2008/007734 | A1 | 1/2008 |
| WO | 2008007734 | A1 | 1/2008 |

* cited by examiner

LITHIUM SECONDARY CELL

TECHNICAL FIELD

The present invention relates to a lithium secondary cell using lithium titanate as an active material for a negative electrode.

BACKGROUND ART

Improvements in a non-aqueous electrolytic solution (electrolyte salt and solvent) and active materials for a negative electrode and a positive electrode have been carried out to enhance cell performance and safety of lithium secondary cells comprising a negative electrode, a non-aqueous electrolytic solution and a positive electrode. For these improvements, various proposals have been made with respect to a non-aqueous electrolytic solution and an active material for a positive electrode.

Regarding an active material for a negative electrode, for example, Patent Document 1 describes that in order to enhance flame retardancy, molten salt and phosphoric ester are used as an electrolyte, an imidazole type or amide type non-fluorine-containing organic compound is used as a solvent, and an active material comprising lithium titanate is used as an active material for a negative electrode.

PRIOR ART DOCUMENT

Patent Document

Patent Document 1: JP2005-243620A

DISCLOSURE OF INVENTION

Problem to be Solved by the Invention

The inventors of the present invention have found that in lithium secondary cells using a fluorine-containing non-aqueous electrolytic solution, discharge capacity, rate characteristics and further cycle characteristics are specifically excellent and incombustibility (safety) is improved by the use of barium titanate, and thus have completed the present invention.

Means to Solve the Problem

The present invention relates to a lithium secondary cell comprising a negative electrode, a non-aqueous electrolytic solution and a positive electrode, in which an active material for the negative electrode comprises lithium titanate and the non-aqueous electrolytic solution comprises a fluorine-containing solvent.

It is preferable, from the viewpoint of good safety, that the non-aqueous electrolytic solution to be used in the present invention comprises an electrolyte salt and a solvent for dissolving the electrolyte salt, and the solvent for dissolving the electrolyte salt comprises at least one fluorine-containing solvent (I) selected from the group consisting of a fluorine-containing ether, a fluorine-containing ester, a fluorine-containing chain carbonate and a fluorine-containing cyclic carbonate, and other carbonate (II).

The fluorine-containing solvent (I) is preferably a fluorine-containing ether represented by the formula (IA):

$$Rf^1ORf^2$$

wherein $Rf^1$ is a fluorine-containing alkyl group having 3 to 6 carbon atoms, $Rf^2$ is a fluorine-containing alkyl group having 2 to 6 carbon atoms, from the viewpoint of improvement in safety and good load characteristics;
a fluorine-containing ester represented by the formula (IB):

$$Rf^3COORf^4$$

wherein $Rf^3$ is an alkyl group which has 1 to 2 carbon atoms and may have fluorine atom, $Rf^4$ is an alkyl group which has 1 to 4 carbon atoms and may have fluorine atom, at least either $Rf^3$ or $Rf^4$ is a fluorine-containing alkyl group, from the viewpoint of improvement in safety and good load characteristics;
a fluorine-containing chain carbonate represented by the formula (IC):

$$Rf^5OCOORf^6$$

wherein $Rf^5$ is a fluorine-containing alkyl group having 1 to 4 carbon atoms, $Rf^6$ is an alkyl group which has 1 to 4 carbon atoms and may have fluorine atom, from the viewpoint of improvement in safety and good load characteristics; or
a fluorine-containing cyclic carbonate represented by the formula (ID):

wherein $X^1$, $X^2$, $X^3$ and $X^4$ are the same or different and each is hydrogen atom, fluorine atom or an alkyl group which has 1 to 4 carbon atoms and may have fluorine atom, at least one of $X^1$ to $X^4$ is fluorine atom or a fluorine-containing alkyl group, from the viewpoint of improvement in safety and good load characteristics. Two or more of these may be used in combination.

It is preferable that the other carbonate (II) is a non-fluorine-containing cyclic carbonate (IIA) or a non-fluorine-containing chain carbonate (IIB), from the viewpoint of good rate characteristics and cycle characteristics.

It is preferable that the non-fluorine-containing cyclic carbonate (IIA) is one of ethylene carbonate and propylene carbonate or a mixture thereof, from the viewpoint of good cycle characteristics.

It is preferable that the non-fluorine-containing chain carbonate (IIB) is one of dimethyl carbonate, methyl ethyl carbonate and diethyl carbonate or a mixture thereof, from the viewpoint of good rate characteristics.

It is preferable, from the viewpoint of improvement in safety, that in the solvent for dissolving the electrolyte salt to be used on the lithium secondary cell of the present invention, when the total amount of fluorine-containing solvent (I) and other carbonate (II) is assumed to be 100% by volume, the fluorine-containing solvent (I) is contained in an amount of 10 to 80% by volume and the other carbonate (II) is contained in an amount of 20 to 90% by volume.

It is preferable, from the viewpoint of improvement in safety and good cell characteristics, that in the case of using the non-fluorine-containing cyclic carbonate (IIA) and the non-fluorine-containing chain carbonate (IIB) as the other carbonate (II), when the total amount of fluorine-containing solvent (I), (IIA) and (IIB) is assumed to be 100% by volume, the fluorine-containing solvent (I) is contained in an amount of 10 to 80% by volume, (IIA) is contained in an amount of 10 to 50% by volume and (IIB) is contained in an amount of 10 to 80% by volume.

Effect of the Invention

The present invention can provide a lithium secondary cell having specifically excellent discharge capacity, rate characteristics and further cycle characteristics and improved incombustibility (safety).

EMBODIMENT FOR CARRYING OUT THE INVENTION

The lithium secondary cell of the present invention comprises a negative electrode, a non-aqueous electrolytic solution and a positive electrode. Also a separator is often used. Each component is explained below.

(1) Negative Electrode

A negative electrode is usually formed by applying a mixture of negative electrode materials comprising an active material for a negative electrode, a binding agent (binder) and if necessary, an electrically conductive material to a current collector for a negative electrode.

In the present invention, the active material for a negative electrode comprises lithium titanate as an essential component.

Examples of lithium titanate include $Li_4Ti_5O_{12}$, $Li_2Ti_3O_7$, $LiTiO_3$, and the like. In addition, $Li[Li_{1/4}Mg_{1/8}Ti_{13/8}]O_4$ or $Li[Li_{1/4}Al_{1/4}Ti_{3/2}]O_4$ which is obtained by replacing 16d site of 6 coordination bonds of $Li[Li_{1/3}Ti_{5/3}]O_4$ by Mg or Al is exemplified as lithium titanate.

Other active materials for a negative electrode may also be used together. Examples of other active material for a negative electrode are carbon materials, and in addition, metallic oxides (other than potassium titanate) and metallic nitrides to which lithium ion can be inserted. Examples of carbon materials include natural graphite, artificial graphite, pyrocarbon, coke, mesocarbon microbeads, carbon fiber, activated carbon and pitch-coated graphite. Examples of metallic oxides to which lithium ion can be inserted include tin oxide, silicon oxide, Si—C complex oxide and carbon-coated Si, and examples of metallic nitrides include $Li_{2.6}Co_{0.4}N$, and the like.

Examples of usable binding agents include polyvinylidene fluoride, polytetrafluoroethylene, styrene-butadiene rubber, carboxymethyl cellulose, polyimide and polyaramid.

Electrically conductive materials which can be used for a mixture of negative electrode materials for lithium secondary cells may be used, and examples thereof include electrically conductive carbon materials, for example, natural graphite, artificial graphite, pyrocarbon, coke, mesocarbon microbeads, carbon fiber, activated carbon and pitch-coated graphite which are exemplified above as other active material for a negative electrode.

The negative electrode can be prepared by forming these components into slurry by using a solvent such as water or N-methylpyrrolidone, applying the slurry to a current collector (for example, metal foil or sheet of copper, stainless steel or nickel) and then drying the slurry.

The content of lithium titanate is preferably not more than 97% by mass, further preferably not more than 95% by mass, especially preferably not more than 93% by mass to the mixture of negative electrode materials. A too high content tends to be disadvantageous from the viewpoint of adhesion. A lower limit of the content is preferably 85% by mass, further preferably 87% by mass, especially preferably 90% by mass from the viewpoint of good effect of improving discharge capacity, rate characteristics and cycle characteristics.

(2) Positive Electrode

A positive electrode is usually formed by applying a mixture of positive electrode materials comprising an active material for a positive electrode, a binding agent (binder) and if necessary, an electrically conductive material to a current collector for a positive electrode.

Active materials for a positive electrode which can be used for a mixture of positive electrode materials for lithium secondary cells may be used. Examples of preferred active materials for a positive electrode include cobalt compound oxides, nickel compound oxides, manganese compound oxides, iron compound oxides and vanadium compound oxides because lithium secondary cells having high energy density and high output are provided.

Example of cobalt compound oxide includes $LiCoO_2$, example of nickel compound oxide includes $LiNiO_2$, and example of manganese compound oxide includes $LiMnO_2$. Also, compound oxides of CoNi represented by $LiCO_xNi_{1-x}O_2$ (0<x<1), compound oxides of CoMn represented by $LiCO_xMn_{1-x}O_2$ (0<x<1), compound oxides of NiMn represented by $LiNi_xMn_{1-x}O_2$ (0<x<1) and $LiNi_xMn_{2-x}O_4$ (0<x<2) and compound oxides of NiCoMn represented by $LiNi_{1-x-y}Co_xMn_yO_2$ (0<x<1, 0<y<1, 0<x+y<1) may be used. In these lithium-containing compound oxides, a part of metal elements such as Co, Ni and Mn may be replaced by at least one metal element such as Mg, Al, Zr, Ti and Cr.

Examples of iron compound oxide include $LiFeO_2$ and $LiFePO_4$, and example of vanadium compound oxide includes $V_2O_5$.

Among the above-mentioned compound oxides, nickel compound oxides and cobalt compound oxides are preferred as an active material for a positive electrode since capacity can be increased. Especially in the case of a small size lithium ion secondary cell, the use of cobalt compound oxides is desirable from the viewpoint of high energy density and safety.

In addition, materials described, for example, in JP2008-127211A and JP2006-36620A can be used.

Electrically conductive materials and binding agents exemplified in the above explanations on the negative electrode can be used.

The positive electrode can be prepared by forming these components into slurry by using a solvent such as toluene or N-methylpyrrolidone, applying the slurry to a current collector (for example, metal foil, sheet or net of aluminum, stainless steel or titanium which is usually used) and then drying the slurry.

In the present invention, especially for the uses on large size lithium secondary cells for hybrid cars and distributed power source, since high output is demanded, it is preferable that particles of an active material for a positive electrode mainly comprise secondary particles, and an average particle size of the secondary particles is not more than 40 μM and fine particles having an average primary particle size of not more than 1 μm are contained in an amount of 0.5 to 7.0% by volume.

When fine particles having an average primary particle size of not more than 1 μm are contained, an area thereof coming into contact with an electrolytic solution is increased and lithium ion can be scattered more rapidly between the electrode and the electrolytic solution, thereby enabling output performance to be improved.

(3) Non-Aqueous Electrolytic Solution

The non-aqueous electrolytic solution to be used in the present invention comprises an electrolyte salt and a solvent for dissolving the electrolyte salt, and the solvent for dissolving the electrolyte salt comprises a fluorine-containing solvent. By the use of the solvent comprising a fluorine-containing solvent, incombustibility (safety) is improved and discharge capacity, rate characteristics and further cycle characteristics are specifically improved.

It is especially preferable that the solvent for dissolving the electrolyte salt comprises a fluorine-containing solvent, and comprises at least one fluorine-containing solvent (I) selected from the group consisting of a fluorine-containing ether, a fluorine-containing ester, a fluorine-containing chain carbonate and a fluorine-containing cyclic carbonate and other carbonate (II), from the viewpoint of good cell characteristics.

Each component and its content are explained below.

(I) Fluorine-containing solvent (at least one selected from the group consisting of the fluorine-containing ether (IA), the fluorine-containing ester (IB), the fluorine-containing chain carbonate (IC) and the fluorine-containing cyclic carbonate (ID))

When the fluorine-containing solvent (I) is contained, there can be obtained a function of giving flame retardancy to the electrolytic solution, a function of improving low-temperature characteristics and an effect of improving rate characteristics and oxidation resistance.

Examples of the fluorine-containing ether (IA) include compounds described in JP08-037024A, JP09-097627A, JP11-026015A, JP2000-294281A, JP2001-052737A and JP11-307123A.

Particularly the fluorine-containing ether represented by the formula (IA):

$$Rf^1ORf^2$$

wherein $Rf^1$ is a fluorine-containing alkyl group having 3 to 6 carbon atoms, $Rf^2$ is a fluorine-containing alkyl group having 2 to 6 carbon atoms, is preferred from the viewpoint of good compatibility with other solvents and proper boiling point.

Examples of $Rf^1$ include fluorine-containing alkyl groups having 3 to 6 carbon atoms such as $HCF_2CF_2CH_2$—, $HCF_2CF_2CF_2CH_2$—, $HCF_2CF_2CF_2CF_2CH_2$—, $CF_3CF_2CH_2$—, $CF_3CFHCF_2CH_2$—, $HCF_2CF(CF_3)CH_2$—, $CF_3CF_2CH_2CH_2$— and $CF_3CH_2CH_2$—O—, and examples of $Rf^2$ include fluorine-containing alkyl groups having 2 to 6 carbon atoms such as —$CF_2CF_2H$, —$CF_2CFHCF_3$, —$CF_2CF_2CF_2H$, —$CH_2CH_2CF_3$, —$CH_2CFHCF_3$ and —$CH_2CH_2CF_2CF_3$. It is particularly preferable that $Rf^1$ is an ether having 3 to 4 carbon atoms and $Rf^2$ is a fluorine-containing alkyl group having 2 to 3 carbon atoms, from the viewpoint of satisfactory ionic conductivity.

Examples of the fluorine-containing ether (IA) include one or two or more of $HCF_2CF_2CH_2OCF_2CF_2H$, $CF_3CF_2CH_2OCF_2CF_2H$, $HCF_2CF_2CH_2OCF_2CFHCF_3$, $CF_3CF_2CH_2OCF_2CFHCF_3$, $HCF_2CF_2CH_2OCH_2CFHCF_3$ and $CF_3CF_2CH_2OCH_2CFHCF_3$, and particularly from the viewpoint of good compatibility with other solvents and satisfactory rate characteristics, $HCF_2CF_2CH_2OCF_2CF_2H$, $CF_3CF_2CH_2OCF_2CF_2H$, $HCF_2CF_2CH_2OCF_2CFHCF_3$ and $CF_3CF_2CH_2OCF_2CFHCF_3$ are especially preferred.

Preferred fluorine-containing ester (IB) is a fluorine-containing ester represented by the formula (IB):

$$Rf^3COORf^4$$

wherein $Rf^3$ is an alkyl group which has 1 to 2 carbon atoms and may have fluorine atom, $Rf^4$ is an alkyl group which has 1 to 4 carbon atoms and may have fluorine atom, at least either $Rf^3$ or $Rf^4$ is a fluorine-containing alkyl group, since it is high in flame retardancy and has good compatibility with other solvents.

Examples of $Rf^3$ include $HCF_2$—, $CF_3$—, $CF_3CF_2$—, $HCF_2CF_2$—, $CH_3CF_2$—, $CF_3CH_2$—, $CH_3$— and $CH_3CH_2$—, and particularly from the viewpoint of satisfactory rate characteristics, $CF_3$— and $HCF_2$— are especially preferred.

Examples of $Rf^4$ include fluorine-containing alkyl groups such as —$CF_3$, —$CF_2CF_3$, —$CH_2CF_3$, —$CH_2CH_2CF_3$, —$CH(CF_3)_2$, —$CH_2CF_2CFHCF_3$, —$CH_2C_2F_5$, —$CH_2CF_2CF_2H$, —$CH_2CH_2C_2F_5$, —$CH_2CF_2CF_3$, —$CH_2CF_2CF_2H$ and —$CH_2CF_2CF_2CF_3$, and non-fluorine-containing alkyl groups such as —$CH_3$, —$C_2H_5$, —$C_3H_7$, and —$CH(CH_3)CH_3$, and particularly from the viewpoint of satisfactory compatibility with other solvents, —$CH_2CF_3$, —$CH_2C_2F_5$, —$CH(CF_3)_2$, —$CH_2CF_2CF_2H$, —$CH_3$ and —$C_2H_5$ are especially preferred.

Examples of the fluorine-containing ester (IB) include one or two or more of:

1. fluorine-containing esters, in which both of $Rf^3$ and $Rf^4$ are fluorine-containing alkyl groups:
$CF_3C(=O)OCH_2CF_3$, $CF_3C(=O)OCH_2CF_2CF_3$, $CF_3C(=O)OCH_2CF_2CF_2H$, $HCF_2C(=O)OCH_2CF_3$, $HCF_2C(=O)OCH_2CF_2CF_3$, $HCF_2C(=O)OCF_2CF_2H$ 2. fluorine-containing esters, in which $Rf^3$ is a fluorine-containing alkyl group:
$CF_3C(=O)OCH_3$, $CF_3C(=O)OCH_2CH_3$, $HCF_2C(=O)OCH_3$, $HCF_2C(=O)OCH_2CH_3$, $CH_3CF_2C(=O)OCH_3$, $CH_3CF_2C(=O)OCH_2CH_3$, $CF_3CF_2C(=O)OCH_3$, $CF_3CF_2C(=O)OCH_2CH_3$ 3. fluorine-containing esters, in which $Rf^4$ is a fluorine-containing alkyl group:
$CH_3C(=O)OCH_2CF_3$, $CH_3C(=O)OCH_2CF_2CF_3$, $CH_3C(=O)OCH_2CF_2H$, $CH_3CH_2C(=O)OCH_2CF_3$, $CH_3CH_2C(=O)OCH_2CF_2CF_3$, $CH_3CH_2C(=O)OCH_2CF_2CF_2H$, and among these, the above-mentioned 2. fluorine-containing esters, in which $Rf^3$ is a fluorine-containing alkyl group and 3. fluorine-containing esters, in which $Rf^4$ is a fluorine-containing alkyl group are preferred. Among these, $CF_3C(=O)OCH_3$, $CF_3C(=O)OCH_2CH_3$, $HCF_2C(=O)OCH_3$, $HCF_2C(=O)OCH_2CH_3$, $CH_3C(=O)OCH_2CF_3$ and $CH_3C(=O)OCH_2CF_2CF_3$ are especially preferred from the viewpoint of good compatibility with other solvents and satisfactory rate characteristics.

Preferred examples of the fluorine-containing chain carbonate (IC) include fluorine-containing chain carbonates represented by the formula (IC):

$$Rf^5OCOORf^6$$

wherein $Rf^5$ is a fluorine-containing alkyl group having 1 to 4 carbon atoms, $Rf^6$ is an alkyl group which has 1 to 4 carbon atoms and may have fluorine atom, from the viewpoint of high flame retardancy and satisfactory rate characteristics.

Examples of $Rf^5$ include $CF_3$—, $C_2F_5$—, $(CF_3)_2CH$—, $CF_3CH_2$—, $C_2F_5CH_2$—, $HCF_2CF_2CH_2$— and $CF_2CFHCF_2CH_2$—, and examples of $Rf^6$ include fluorine-containing alkyl groups such as $CF_3$—, $C_2F_5$—, $(CF_3)_2CH$—, $CF_3CH_2$—, $C_2F_5CH_2$—, $HCF_2CF_2CH_2$— and $CF_2CFHCF_2CH_2$— and non-fluorine-containing alkyl groups such as —$CH_3$, —$C_2H_5$, —$C_3H_7$ and —$CH(CH_3)CH_3$. Among these, especially preferred $Rf^5$ are $CF_3CH_2$— and $C_2F_5CH_2$—, and especially preferred $Rf^6$ are $CF_3CH_2$—, $C_2F_5CH_2$—, —$CH_3$ and —$C_2H_5$, from the viewpoint of proper viscosity, good compatibility with other solvents and satisfactory rate characteristics.

Examples of the fluorine-containing chain carbonate (IC) include one or two or more of fluorine-containing chain carbonates such as $CF_3CH_2OCOOCH_2CF_3$, $CF_3CF_2CH_2OCOOCH_2CF_2CF_3$, $CF_3CF_2CH_2OCOOCH_3$, $CF_3CH_2OCOOCH_3$, $CF_3CH_2OCOOCH_3$ and $CF_3CH_2OCOOCH_2CH_3$, and among these, from the viewpoint of proper viscosity, high flame retardancy, good compatibility with other solvents and satisfactory rate characteristics, $CF_3CH_2OCOOCH_2CF_3$, $CF_3CF_2CH_2OCOOCH_2CF_2CF_3$, $CF_3CH_2OCOOCH_3$ and $CF_3CH_2OCOOCH_2CH_3$ are especially preferred. Also, there can be exemplified compounds described, for example, in JP6-21992A, JP2000-327634A and JP2001-256983A.

Preferred examples of the fluorine-containing cyclic carbonate (ID) are fluorine-containing cyclic carbonates represented by the formula (ID):

wherein $X^1$, $X^2$, $X^3$ and $X^4$ are the same or different and each is hydrogen atom, fluorine atom or an alkyl group which has 1 to 4 carbon atoms and may have fluorine atom, at least one of $X^1$ to $X^4$ is fluorine atom or a fluorine-containing alkyl group, from the viewpoint of enhanced safety and good load characteristics.

Examples of an alkyl group which has 1 to 4 carbon atoms and may have fluorine atom include fluorine-containing alkyl groups such as $CH_2F$, $CHF_2$, $CF_3$ and $CH_2CH_2F$; and alkyl groups such as $CH_3$ and $CH_2CH_3$.

Examples of the fluorine-containing cyclic carbonate (ID) include 4-fluoro-1,3-dioxolan-2-one, 4,5-difluoro-1,3-dioxolan-2-one,
4-trifluoromethyl-1,3-dioxolan-2-one,
4-monofluoromethyl-1,3-dioxolan-2-one,
4,5-dimethyl-4,5-difluoro-1,3-dioxolan-2-one, and
4,5-dimethyl-4-fluoro-1,3-dioxolan-2-one, and especially
4-fluoro-1,3-dioxolan-2-one is preferred.

Among the fluorine-containing solvents (I), the fluorine-containing ether (IA), the fluorine-containing chain carbonate (IC) and the fluorine-containing cyclic carbonate (ID) are preferred from the viewpoint of proper viscosity, and good solubility of the electrolyte salt and good rate characteristics, and the fluorine-containing ether (IA) and the fluorine-containing cyclic carbonate (ID) are especially preferred from the viewpoint of good cycle characteristics.

The fluorine-containing ether (IA), the fluorine-containing ester (IB), the fluorine-containing chain carbonate (IC) and the fluorine-containing cyclic carbonate (ID) may be used alone or may be used in combination thereof. In the case of the combination use, combination of (IA) and (IB), combination of (IA) and (IC), combination of (IA) and (ID), and combination of (IC) and (ID) are preferred from the viewpoint of low viscosity and good compatibility with other solvents.

When the total amount of (I) and (II) is assumed to be 100% by volume, preferably the fluorine-containing solvent (I) is contained in an amount of 10 to 80% by volume from the viewpoint of an excellent function of giving flame retardancy to the electrolytic solution, an excellent function of improving low-temperature characteristics and good effect of improving rate characteristics and oxidation resistance. The amount of fluorine-containing solvent (I) is further preferably 10 to 65% by volume, furthermore preferably 15 to 65% by volume, especially preferably 20 to 60% by volume, especially from the viewpoint of improvement in safety.

(II) Other Carbonate

In the present invention, other known carbonate is blended in addition to (I). Other carbonate may be a chain carbonate, a cyclic carbonate, a fluorine-containing carbonate or a non-fluorine-containing carbonate other than the fluorine-containing chain carbonate (IC). From the viewpoint of good low-temperature characteristics and satisfactory cycle characteristics, non-fluorine-containing cyclic carbonates (IIA) and non-fluorine-containing chain carbonates (IIB) are preferred.

(IIA) Non-Fluorine-Containing Cyclic Carbonate

Examples of the non-fluorine-containing cyclic carbonates (IIA) include one or more of ethylene carbonate, propylene carbonate, butylene carbonate and vinyl ethylene carbonate. Among these, ethylene carbonate (EC) and propylene carbonate (PC) are high in dielectric constant, are especially excellent in solubility of an electrolyte salt, and are suitable for the electrolytic solution of the present invention.

This non-fluorine-containing cyclic carbonate has excellent property of dissolving an electrolyte salt and has characteristics of improving rate characteristics and dielectric constant.

Also, vinylene carbonate can be blended as an additional (optional) component for improving cycle characteristics. The amount thereof is desirably from 0.1 to 10% by volume based on the whole electrolytic solution.

(IIB) Non-Fluorine-Containing Chain Carbonate

Examples of the non-fluorine-containing chain carbonates (IIB) include one or more of hydrocarbon type chain carbonates such as $CH_3CH_2OCOOCH_2CH_3$ (diethyl carbonate: DEC), $CH_3CH_2OCOOCH_3$ (methyl ethyl carbonate: MEC), $CH_3OCOOCH_3$ (dimethyl carbonate: DMC) and $CH_3OCOOCH_2CH_3$ (methyl propyl carbonate). Among these, DEC, MEC and DMC are preferred from the viewpoint of low viscosity and good low-temperature characteristics.

It is preferable that when the total amount of (I), (IIA) and (IIB) is assumed to be 100% by volume, (I) is contained in an amount of 10 to 80% by volume, the non-fluorine-containing cyclic carbonate (IIA) is contained in an amount of 10 to 50% by volume and the non-fluorine-containing chain carbonate (IIB) is contained in an amount of 10 to 80% by volume, from the viewpoint of further improvement in safety and good cell characteristics.

When the amount of non-fluorine-containing cyclic carbonate (IIA) is too large, compatibility with other component is lowered, and there is a case where phase separation from other component occurs especially at low temperature atmosphere (for example, −30° C. to −20° C.) such as outdoor temperature in wintertime and inside temperature of a refrigerator. From this point of view, a preferred upper limit is 35% by volume, further 30% by volume. On the contrary, when the amount thereof is too small, solubility of the electrolyte salt in the whole solvents is lowered, and a target concentration (0.8 mole/liter or more) of electrolyte salt cannot be achieved.

The non-fluorine-containing chain carbonate (IIB) is low in viscosity and therefore, has an effect of improving low-temperature characteristics. Accordingly, in the case where low-temperature characteristics need be improved, the non-fluorine-containing chain carbonate may be blended in a proper amount. However, since the non-fluorine-containing chain carbonate is relatively low in flash point, its amount is desirably to such an extent not to impair safety of the cell.

From the viewpoint mentioned above, preferred solvents for the non-aqueous electrolytic solution are those containing the fluorine-containing solvent (I), especially the fluorine-containing ether (IA) in an amount of 20 to 60% by volume, the non-fluorine-containing cyclic carbonate (IIA) in an amount of 10 to 35% by volume and the non-fluorine-containing chain carbonate (IIB) in an amount of 10 to 70% by volume when the total amount of (I), (IIA) and (JIB) is assumed to be 100% by volume.

In the lithium secondary cell of the present invention, the target problem of the present invention can be solved only by the use of the components (I) and (II) as the solvents for the non-aqueous electrolytic solution, but other known solvents may be blended as the solvents for the non-aqueous electrolytic solution. Kinds and amounts of such solvents need be to an extent not to impair the solution of the problem of the present invention.

In the present invention, examples of the electrolyte salt to be used for the non-aqueous electrolytic solution include $LiClO_4$, $LiAsF_6$, $LiBF_4$, $LiPF_6$, $LiN(O_2SCF_3)_2$ and $LiN(O_2SC_2F_5)_2$, and from the viewpoint of good cycle characteristics, especially $LiPF_6$, $LiBF_4$, $LiN(O_2SCF_3)_2$, $LiN(O_2SC_2F_5)_2$ or combination thereof is preferred.

In order to secure practical performance of the lithium secondary cell, the concentration of the electrolyte salt is required to be 0.5 mole/litter or more, further 0.8 mole/litter or more. An upper limit thereof is usually 1.5 mole/litter. The solvent for dissolving the electrolyte salt of the present invention has ability of dissolving the electrolyte salt within a range of concentration satisfying the mentioned requirements.

In the present invention, to the non-aqueous electrolytic solution may be added a flame retardant, a surfactant, an additive for increasing dielectric constant, cycle characteristics and rate characteristics improver and further other additives for improvement of safety without deviation from the specified volume percentages of the components (I) and (II), further the components (I), (IIA) and (IIB) to an extent not to impair the effect of the present invention.

With respect to a flame retardant, known flame retardants can be used. Especially phosphoric ester may be added to impart incombustibility (non-ignition property). Ignition can be prevented by mixing phosphoric ester in an amount of from 1 to 10% by volume based on the solvent for dissolving an electrolyte salt.

Examples of the phosphoric ester include fluorine-containing alkylphosphoric ester, non-fluorine-containing alkylphosphoric ester and arylphosphoric ester, and fluorine-containing alkylphosphoric ester is preferred since it highly contributes to make the electrolytic solution nonflammable and an effect of making the electrolytic solution nonflammable is enhanced even if its amount is small.

Examples of the fluorine-containing alkylphosphoric ester include fluorine-containing dialkylphosphoric esters disclosed in JP11-233141A, cyclic alkylphosphoric esters disclosed in JP11-283669A, and fluorine-containing trialkylphosphoric esters.

Since the fluorine-containing trialkylphosphoric esters have high ability of giving incombustibility and have satisfactory compatibility with the component (I), the amount thereof can be decreased, and even when the amount is from 1 to 8% by volume, further from 1 to 5% by volume, ignition can be prevented.

Preferred examples of the fluorine-containing trialkylphosphoric esters include those represented by the formula: $(RfO)_3—P=O$, wherein Rf is $CF_3—$, $CF_3CF_2—$, $CF_3CH_2—$, $HCF_2CF_2—$ or $CF_3CFHCF_2—$. Especially, tri-2,2,3,3,3-pentafluoropropyl phosphate and tri-2,2,3,3-tetrafluoropropyl phosphate are preferred.

Further, fluorine-containing lactone and fluorine-containing sulfolane can also be exemplified as a flame retardant.

A surfactant may be added in order to improve capacity property and rate characteristics.

Any of cationic surfactants, anionic surfactants, nonionic surfactants and amphoteric surfactants may be used as a surfactant, and fluorine-containing surfactants are preferred from the viewpoint of good cycle characteristics and rate characteristics.

For example, there are exemplified fluorine-containing carboxylates and fluorine-containing sulfonates.

Examples of fluorine-containing carboxylates include $HCF_2C_2F_6COO^-Li^+$, $C_4F_9COO^-Li^+$, $C_5F_{11}COO^-Li^+$, $C_6F_{13}COO^-Li^+$, $C_7F_{15}COO^-Li^+$, $C_8F_{17}COO^-Li^+$, $HCF_2C_2F_6COO^-NH_4^+$, $C_4F_9COO^-NH_4^+$, $C_5F_{11}COONH_4^+$, $C_6F_{13}COO^-NH_4^+$, $C_7F_{15}COO^-NH_4^+$, $C_8F_{17}COO^-NH_4^+$, $HCF_2C_2F_6COO^-NH(CH_3)_3^+$, $C_4F_9COO^-NH(CH_3)_3^+$, $C_5F_{11}COO^-NH(CH_3)_3^+$, $C_6F_{13}COO^-NH(CH_3)_3^+$, $C_7F_{15}COO^-NH(CH_3)_3^+$, $C_8F_{17}COO^-NH(CH_3)_3^+$, and the like. Examples of fluorine-containing sulfonates include $C_4F_9SO_3^-Li^+$, $C_6F_{13}SO_3^-Li^+$, $C_8F_{17}SO_3^-Li^+$, $C_4F_9SO_3^-NH_4^+$, $C_6F_{13}SO_3^-NH_4^+$, $C_8F_{17}SO_3^-NH_4^+$, $C_4F_9SO_3^-NH(CH_3)_3^+$, $C_6F_{13}SO_3^-NH(CH_3)_3^+$, $C_8F_{17}SO_3^-NH(CH_3)_3^+$, and the like.

The amount of surfactant is preferably from 0.01 to 2% by mass based on the whole solvents for dissolving the electrolyte salt from the viewpoint of decreasing a surface tension of the electrolytic solution without lowering charge-discharge cycle characteristics.

Examples of an additive for increasing dielectric constant include sulfolane, methyl sulfolane, γ-butyrolactone, γ-valerolactone, acetonitrile, propionitrile and the like.

Examples of an overcharging inhibitor include hexafluorobenzene, fluorobenzene, cyclohexylbenzene, dichloroaniline, difluoroaniline, toluene, and the like.

For improving rate characteristics, tetrahydrofuran, silicate compounds and the like are effective.

(4) Separator

A separator which can be used in the present invention is not limited particularly, and there are exemplified microporous polyethylene films, microporous polypropylene films, microporous ethylene-propylene copolymer films, microporous polypropylene/polyethylene two-layer films, microporous polypropylene/polyethylene/polypropylene three-layer films, etc.

Also, there are films prepared by coating an aramid resin on a separator or films prepared by coating a resin comprising polyamide imide and alumina filler on a separator which are made for the purpose of enhancing safety such as prevention of short-circuit due to Li dendrite (cf., for example, JP2007-299612A and JP2007-324073A).

The lithium secondary cell of the present invention is useful as a large size lithium secondary cell for hybrid cars and distributed power source, and in addition, are useful as a small size lithium secondary cell for mobile phone and portable remote terminal.

EXAMPLE

The present invention is then explained by means of examples, but the present invention is not limited to them.

Compounds used in the following examples and comparative examples are as follows.

Component (I)
　(IA-1): $HCF_2CF_2CH_2OCF_2CF_2H$
　(IA-2): $HCF_2CF_2CH_2OCF_2CFHCF_3$
　(IA-3): $CF_3CF_2CH_2OCF_2CF_2H$
　(IA-4): $HCF_2CF_2OCH_3$
　(IA-5): $HCF_2CF_2CH_2OC_2H_5$
　(IB-1): $CF_3COOCH_2CF_2CF_2H$
　(IC-1): $CF_3CH_2OCOOCH_2CF_3$
　(ID-1): 4-fluoro-1,3-dioxolan-2-one Component (IIA)
　(IIA-1): Ethylene carbonate
　(IIA-2): Propylene carbonate Component (IIB)
　(IIB-1): Dimethyl carbonate
　(IIB-2): Methyl ethyl carbonate
　(IIB-3): Diethyl carbonate Preparation Example 1

$HCF_2CF_2CH_2OCF_2CF_2H$ (IA-1) as the component (I), ethylene carbonate (IIA-1) as the component (IIA) and dimethyl carbonate (IIB-1) as the component (IIB) were mixed in the volume % ratio of 40/20/40, and to this solvent for dissolving an electrolyte salt was added $LiPF_6$ as the electrolyte salt to give a concentration of 1.0 mole/liter, followed by sufficiently stirring at 25° C. Thus, a non-aqueous electrolytic solution to be used in the present invention was prepared.

Preparation Example 2

A non-aqueous electrolytic solution to be used in the present invention was prepared in the same manner as in Preparation Example 1 except that $HCF_2CF_2CH_2OCF_2CFHCF_3$ (IA-2) was used as the component (I).

Preparation Example 3

A non-aqueous electrolytic solution to be used in the present invention was prepared in the same manner as in Preparation Example 1 except that $CF_3CF_2CH_2OCF_2CF_2H$ (IA-3) was used as the component (I).

Preparation Example 4

A non-aqueous electrolytic solution to be used in the present invention was prepared in the same manner as in Preparation Example 1 except that $HCF_2CF_2OCH_3$ (IA-4) was used as the component (I).

Preparation Example 5

A non-aqueous electrolytic solution to be used in the present invention was prepared in the same manner as in Preparation Example 1 except that $HCF_2CF_2CH_2OC_2H_5$ (IA-5) was used as the component (I).

Preparation Example 6

A non-aqueous electrolytic solution to be used in the present invention was prepared in the same manner as in Preparation Example 1 except that $CF_3COOCH_2CF_2CF_2H$ (IB-1) was used as the component (I).

Preparation Example 7

A non-aqueous electrolytic solution to be used in the present invention was prepared in the same manner as in Preparation Example 1 except that $CF_3CH_2OCOOCH_2CF_3$ (IC-1) was used as the component (I).

Preparation Examples 8 to 16

Non-aqueous electrolytic solutions of the present invention were prepared in the same manner as in Preparation Example 1 except that the components (I), (IIA) and (IIB) were used in amounts shown in Table 2.

Preparation Examples 17 to 19

Non-aqueous electrolytic solutions to be used in the present invention were prepared in the same manner as in Preparation Examples 1, 2 and 3 except that there were used, as an electrolyte salt, $LiN(O_2SCF_3)_2$ (Preparation Example 17), $LiN(O_2SC_2F_5)_2$ (Preparation Example 18) and $LiBF_4$ (Preparation Example 19), respectively instead of $LiPF_6$.

Preparation Example 20

A non-aqueous electrolytic solution of the present invention was prepared in the same manner as in Preparation Example 1 except that 4-fluoro-1,3-dioxolan-2-one (ID-1) was used as the component (I) and the component (IIB) was used in the amount shown in Table 4.

Preparation Examples 21 and 22

Non-aqueous electrolytic solutions of the present invention were prepared in the same manner as in Preparation Example 1 except that $HCF_2CF_2CH_2OCF_2CF_2H$ (IA-1) and 4-fluoro-1,3-dioxolan-2-one (ID-1) were used as the component (I) and the component (IIB) was used in the amount shown in Table 4.

Preparation Example 23

A non-aqueous electrolytic solution of the present invention was prepared in the same manner as in Preparation Example 1 except that $CF_3CH_2OCOOCH_2CF_3$ (IC-1) and 4-fluoro-1,3-dioxolan-2-one (ID-1) were used as the component (I) and the component (IIB) was used in the amount shown in Table 4.

Preparation Example 24

A non-aqueous electrolytic solution of the present invention was prepared in the same manner as in Preparation Example 1 except that $HCF_2CF_2CH_2OCF_2CF_2H$ (IA-1) and 4-fluoro-1,3-dioxolan-2-one (ID-1) were used as the component (I) and the components (IIA) and (IIB) were used in the amounts shown in Table 4.

Comparative Preparation Example 1

A comparative non-aqueous electrolytic solution was prepared in the same manner as in Preparation Example 1 except that the component (I) was not blended and ethylene carbonate (IIA-1) and dimethyl carbonate (IIB-1) were mixed in the volume % ratio of (IIA-1)/(IIB-1)=30/70.

Examples 1 to 19 and Comparative Example 1

Lithium secondary cells were prepared in the manner as explained below by using the respective non-aqueous electrolytic solutions prepared in Preparation Examples 1 to 19 and Comparative Preparation Example 1, and tests for the following cell characteristics (discharge capacity, rate characteristics and cycle characteristics) of these lithium secondary cells were conducted.

The results of Examples 1 to 7 and Comparative Example 1 are shown in Table 1, the results of Examples 8 to 16 are shown in Table 2, and the results of Examples 17 to 19 are shown in Table 3.

(Preparation of Bipolar Cell)

An active material for a positive electrode prepared by mixing $LiCoO_2$, carbon black and polyvinylidene fluoride (trade name KF-1000 available from KUREHA CORPORATION) in a ratio of 90/3/7 (mass percent ratio) was dispersed in N-methyl-2-pyrrolidone to be formed into a slurry which was then uniformly coated on a positive electrode current collector (15 μm thick aluminum foil) and dried to form a layer made of a mixture of positive electrode materials. Then, the coated aluminum foil was subjected to compression molding with a roller press, and after cutting, a lead wire was welded thereto to prepare a strip-like positive electrode.

Separately, an active material for a negative electrode prepared by mixing lithium titanate ($Li[Li_{1/3}Ti_{5/3}]O_4$ available from ISHIHARA SANGYO KAISHA, LTD.), acetylene black and polyvinylidene fluoride (trade name KF-1000 available from KUREHA CORPORATION) in a ratio of 87/10/3 (mass percent ratio) was dispersed in N-methyl-2-pyrrolidone to be formed into a slurry which was then uniformly coated on a negative electrode current collector (10 μm thick copper foil) and dried to form a layer made of a mixture of negative electrode materials. Then, the coated copper foil was subjected to compression molding with a roller press, and after cutting and drying, a lead wire was welded thereto to prepare a strip-like negative electrode.

Figure 1:
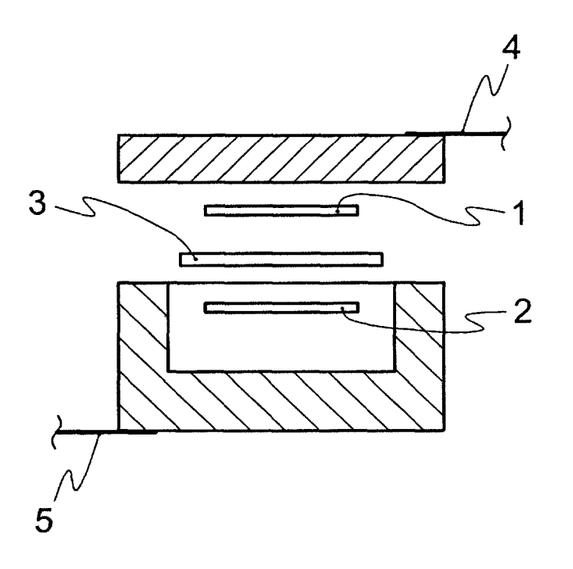
FIG. 1 is a diagrammatic cross-sectional view of a bipolar cell prepared for a test for cell characteristics.

The above strip-like positive electrode and negative electrode were cut into a size of 16 mm diameter, and a 20 μm thick microporous polyethylene film was cut into a size of 25 mm diameter to make a separator. These were combined and set as shown in a diagrammatic longitudinal cross-sectional view of FIG. 1 to make a bipolar cell. In FIG. 1, numeral 1 is a positive electrode; numeral 2 is a negative electrode; numeral 3 is a separator; numeral 4 is a positive electrode terminal; and numeral 5 is a negative electrode terminal.

Then, 2 ml each of the electrolytic solutions prepared in Examples 1 to 19 and Comparative Example 1 was put in this cell, and the cell was sealed. A capacity of the cell was 3 mAh. After the electrolytic solution had been sufficiently penetrated in the separator, etc., chemical treatment was carried out to make a bipolar cell.

Tests for Cell Characteristics (Discharge Capacity)

When a charge/discharging current is represented by C and 1 C is assumed to be 4 mA, discharge capacity is measured under the following charge/discharge measuring conditions. Discharge capacity is indicated by an index, assuming the discharge capacity of Comparative Example 1 to be 100.

Charge and Discharge Conditions

Charging: Charging is continued at 2.0 C at 2.8 V until a charging current reaches $1/10$ C (CC·CV charge).

Discharging: 2.0 C, 1.0 V cut (CC discharge)

(Rate Characteristic)

Charging is continued at 2.0 C at 2.8 V until a charging current reaches $1/10$ C, and discharging is continued at a current equivalent to 0.2 C until 1.0 V is reached, and then discharge capacity is determined. Subsequently, charging is continued at 2.0 C at 2.8 V until a charging current reaches $1/10$ C, and discharging is continued at a current equivalent to 5 C until 1.0 V is reached, and then discharge capacity is determined. The discharge capacity at 5 C and the discharge capacity at 0.2 C are substituted in the following equation to obtain a rate characteristic.

$$\text{Rate characteristic (\%)} = \text{Discharge capacity (mAh) at } 5\text{ C/Discharge capacity (mAh) at } 0.2\text{ C} \times 100$$

(Cycle Characteristic)

Charge and discharge cycle to be conducted under the above-mentioned charge and discharge conditions (Charging is continued at 2.0 C at 2.8 V until a charging current reaches $1/10$ C, and discharging is continued at a current equivalent to 2.0 C until 1.0 V is reached) is assumed to be one cycle, and discharge capacity after the first cycle and discharge capacity after the hundredth cycle are measured. Cycle characteristic is represented by a cycle maintenance factor obtained by the following equation.

$$\text{Cycle maintenance factor (\%)} = \text{Discharge capacity (mAh) after the hundredth cycle/Discharge capacity (mAh) after the first cycle} \times 100$$

TABLE 1

|  | Example | | | | | | | Com. Ex. |
|---|---|---|---|---|---|---|---|---|
|  | 1 | 2 | 3 | 4 | 5 | 6 | 7 | 1 |
| Electrolytic solution | | | | | | | | |
| Solvent components | | | | | | | | |
| Component (I) | | | | | | | | |
| Kind | IA-1 | IA-2 | IA-3 | IA-4 | IA-5 | IB-1 | IC-1 | — |
| Proportion (volume %) | 40 | 40 | 40 | 40 | 40 | 40 | 40 | — |
| Component (IIA) | | | | | | | | |
| Kind | IIA-1 | IIA-1 | IIA-1 | IIA-1 | IIA-1 | IIA-1 | IIA-1 | IIA-1 |
| Proportion (volume %) | 20 | 20 | 20 | 20 | 20 | 20 | 20 | 30 |
| Component (IIB) | | | | | | | | |
| Kind | IIB-1 | IIB-1 | IIB-1 | IIB-1 | IIB-1 | IIB-1 | IIB-1 | IIB-1 |
| Proportion (volume %) | 40 | 40 | 40 | 40 | 40 | 40 | 40 | 70 |

TABLE 1-continued

|  | Example | | | | | | | Com. Ex. |
|---|---|---|---|---|---|---|---|---|
|  | 1 | 2 | 3 | 4 | 5 | 6 | 7 | 1 |
| Electrolyte salt (mole/liter) | | | | | | | | |
| $LiPF_6$ | 1.0 | 1.0 | 1.0 | 1.0 | 1.0 | 1.0 | 1.0 | 1.0 |
| Cell characteristics | | | | | | | | |
| Discharge capacity (index) | 104.0 | 102.3 | 103.5 | 105.2 | 104.5 | 103.2 | 102.5 | 100.0 |
| Rate characteristic (%) | 95.6 | 95.2 | 95.1 | 95.8 | 95.3 | 95.2 | 94.8 | 89.5 |
| Cycle characteristic (%) | 96.5 | 96.1 | 95.8 | 96.3 | 95.6 | 92.5 | 93.5 | 86.5 |

TABLE 2

|  | Example | | | | | | | | |
|---|---|---|---|---|---|---|---|---|---|
|  | 8 | 9 | 10 | 11 | 12 | 13 | 14 | 15 | 16 |
| Electrolytic solution Solvent components Component (I) | | | | | | | | | |
| Kind | IA-1 | IA-1 | IA-1 | IA-1 | IA-1 | IA-1 | IA-1 | IA-1 | IA-1 |
| Proportion (volume %) | 40 | 40 | 40 | 40 | 40 | 40 | 40 | 10 | 60 |
| Component (IIA) | | | | | | | | | |
| Kind | IIA-2 | IIA-1 + IIA-2 | IIA-1 | IIA-1 | IIA-1 | IIA-1 | IIA-1 | IIA-1 | IIA-1 |
| Proportion (volume %) | 20 | 20 + 10 | 20 | 20 | 20 | 20 | 20 | 20 | 20 |
| Component (IIB) | | | | | | | | | |
| Kind | IIB-1 | IIB-1 | IIB-2 | IIB-3 | IIB-1 + IIB-2 | IIB-1 + IIB-2 | IIB-1 + IIB-2 | IIB-1 | IIB-1 |
| Proportion (volume %) | 40 | 30 | 40 | 40 | 20 + 20 | 20 + 20 | 20 + 20 | 70 | 20 |
| Electrolyte salt (mole/liter) | | | | | | | | | |
| $LiPF_6$ | 1.0 | 1.0 | 1.0 | 1.0 | 1.0 | 1.0 | 1.0 | 1.0 | 1.0 |
| Cell characteristics | | | | | | | | | |
| Discharge capacity (index) | 101.3 | 103.7 | 102.8 | 102.5 | 103.4 | 103.2 | 102.7 | 105.1 | 102.3 |
| Rate characteristic (%) | 93.2 | 94.8 | 94.3 | 93.0 | 95.0 | 94.3 | 93.6 | 96.2 | 94.6 |
| Cycle characteristic (%) | 87.5 | 89.3 | 96.1 | 96.7 | 96.1 | 96.6 | 96.4 | 96.0 | 94.8 |

TABLE 3

|  | Example | | |
|---|---|---|---|
|  | 17 | 18 | 19 |
| Electrolytic solution Solvent components Component (I) | | | |
| Kind | IA-1 | IA-2 | IA-3 |
| Proportion (volume %) | 40 | 40 | 40 |
| Component (IIA) | | | |
| Kind | IIA-1 | IIA-1 | IIA-1 |
| Proportion (volume %) | 20 | 20 | 20 |
| Component (IIB) | | | |
| Kind | IIB-1 | IIB-1 | IIB-1 |
| Proportion (volume %) | 40 | 40 | 40 |
| Electrolyte salt (mole/liter) | | | |
| $LiN(O_2SCF_3)_2$ | 1.0 | — | — |
| $LiN(O_2SC_2F_5)_2$ | — | 1.0 | — |
| $LiBF_4$ | — | — | 1.0 |
| Cell characteristics | | | |
| Discharge capacity (index) | 103.1 | 102.8 | 102.1 |
| Rate characteristic (%) | 95.3 | 95.1 | 94.8 |
| Cycle characteristic (%) | 95.4 | 95.8 | 94.0 |

From the results shown in Tables 1 to 3, it is seen that the lithium secondary cells using a negative electrode comprising lithium titanate and further a non-aqueous electrolytic solution comprising a fluorine-containing solvent are excellent in discharge capacity, rate characteristics and cycle characteristics.

Examples 20 to 24

Lithium secondary cells were prepared in the manner mentioned below by using the non-aqueous electrolytic solutions prepared in Preparation Examples 20 to 24, and tests for the cell characteristics (discharge capacity, rate characteristics and cycle characteristics) of these lithium secondary cells were conducted in the same manner as in Example 1. The results are shown in Table 4.

(Preparation of Bipolar Cell)

An active material for a positive electrode prepared by mixing $LiCo_{1/3}Mn_{1/3}Ni_{1/3}$ (available from Nippon Chemical Industrial Co., Ltd.), carbon black and polyvinylidene fluoride (trade name KF-1100 available from KUREHA CORPORATION) in a ratio of 90/3/7 (mass percent ratio) was dispersed in N-methyl-2-pyrrolidone to be formed into a slurry which was then uniformly coated on a positive electrode current collector (15 µm thick aluminum foil) and dried to form a layer made of a mixture of positive electrode materials. Then, the coated aluminum foil was subjected to compression molding with a roller press, and after cutting, a lead wire was welded thereto to prepare a strip-like positive electrode.

Separately, an active material for a negative electrode prepared by mixing lithium titanate ($Li[Li_{1/3}Ti_{5/3}]O_4$ available from ISHIHARA SANGYO KAISHA, LTD.), acetylene black and polyvinylidene fluoride (trade name KF-1100 available from KUREHA CORPORATION) in a ratio of 91/6/3 (mass percent ratio) was dispersed in N-methyl-2-pyrrolidone to be formed into a slurry which was then uniformly coated on a negative electrode current collector (10 μm thick copper foil) and dried to form a layer made of a mixture of negative electrode materials. Then, the coated copper foil was subjected to compression molding with a roller press, and after cutting and drying, a lead wire was welded thereto to prepare a strip-like negative electrode.

A bipolar cell was prepared in the same manner as in Example 1 by using these strip-like positive electrode and negative electrode.

sufficiently penetrated in the separator, etc., sealing of the case, pre-charging and aging were carried out to make cylindrical lithium secondary cells.

The over-charge test of these lithium secondary cells were carried out to evaluate safety at over-charging.

(Over-Charge Test)

The cylindrical cells prepared above are discharged at a current equivalent to 1 CmA until 3.0 V is reached, and over-charging is carried out at a current equivalent to 3 CmA up to an upper limit voltage of 12 V, and whether or not firing or bursting occurs is examined. When firing or bursting occurs, it is shown by X, and when neither firing nor bursting occurs, it is shown by ○.

TABLE 4

| | Example | | | | |
|---|---|---|---|---|---|
| | 20 | 21 | 22 | 23 | 24 |
| Electrolytic solution Solvent components Component (I) | | | | | |
| Kind | ID-1 | IA-1 + ID-1 | IA-1 + ID-1 | IC-1 + ID-1 | IA-1 + ID-1 |
| Proportion (volume %) | 20 | 20 + 20 | 30 + 20 | 20 + 20 | 20 + 10 |
| Component (IIA) | | | | | |
| Kind | — | — | — | — | IIA-3 |
| Proportion (volume %) | — | — | — | — | 10 |
| Component (IIB) | | | | | |
| Kind | IIB-1 + IIB-2 | IIB-2 | IIB-2 | IIB-2 | IIB-1 + IIB-2 |
| Proportion (volume %) | 40 + 40 | 60 | 50 | 60 | 30 + 30 |
| Electrolyte salt (mole/liter) | | | | | |
| $LiPF_6$ | 1.0 | 1.0 | 1.0 | 1.0 | 1.0 |
| Cell characteristics | | | | | |
| Discharge capacity (index) | 102.5 | 102.5 | 102.2 | 101.1 | 102.5 |
| Rate characteristic (%) | 96.2 | 98.2 | 97.4 | 93.3 | 97.1 |
| Cycle characteristic (%) | 95.4 | 97.2 | 96.8 | 95.1 | 97.6 |

Example 25

Lithium secondary cells (cylindrical cell) were made by using the non-aqueous electrolytic solutions prepared in Example 1 and Comparative Example 1 by the following method and an over-charge test of these lithium secondary cells was conducted. The results are shown in Table 5.

(Preparation of Cylindrical Cell)

The strip-like positive electrode made above was placed on the strip-like negative electrode made above with a 20 μm thick microporous polyethylene film (separator) being interposed between them, followed by winding spirally to make a laminated electrode of spiral-wound structure. In this case, winding was carried out so that the un-coated surface of the positive electrode current collector faces outward. After this, the laminated electrode was put in a cylindrical bottomed cell case having an outer diameter of 18 mm, and welding of lead wires for the positive electrode and negative electrode was carried out.

Then, the electrolytic solutions for testing were poured into the cell case, and after the electrolytic solution had been

TABLE 5

| | Example 1 | Com. Ex. 1 |
|---|---|---|
| Electrolytic solution Solvent components Component (I) | | |
| Kind | IA-1 | — |
| Proportion (volume %) | 40 | — |
| Component (IIA) | | |
| Kind | IIA-1 | IIA-1 |
| Proportion (volume %) | 20 | 30 |
| Component (IIB) | | |
| Kind | IIB-1 | IIB-1 |
| Proportion (volume %) | 40 | 70 |
| Electrolyte salt (mole/liter) | | |
| $LiPF_6$ | 1.0 | 1.0 |
| Over-charge test (safety) | ○ | X |

EXPLANATION OF SYMBOLS

1 Positive electrode
2 Negative electrode
3 Separator
4 Positive electrode terminal
5 Negative electrode terminal

What is claimed is:

1. A lithium secondary cell comprising a negative electrode, a non-aqueous electrolytic solution and a positive electrode, wherein an active material for the negative electrode comprises lithium titanate, the non-aqueous electrolytic solution comprises an electrolyte salt and a solvent for dissolving the electrolyte salt and said solvent for dissolving the electrolyte salt comprises at least one fluorine-containing solvent (I) and other carbonate (II), the at least one fluorine-containing solvent (I) is selected from the group consisting of a fluorine-containing ether, a fluorine-containing ester, a fluorine-containing chain carbonate and a fluorine-containing cyclic carbonate, and the fluorine-containing chain carbonate is represented by the formula (IC):

wherein $Rf^5$ is $CF_3CH_2-$ or $C_2F_5CH_2-$, $Rf^6$ is $CF_3CH_2-$, $C_2F_5CH_2-$, $-CH_3$, or $-C_2H_5$.

2. The lithium secondary cell of claim 1, wherein the fluorine-containing solvent (I) is at least one selected from the group consisting of:

a fluorine-containing ether represented by the formula (IA):

wherein $Rf^1$ is a fluorine-containing alkyl group having 3 to 6 carbon atoms, $Rf^2$ is a fluorine-containing alkyl group having 2 to 6 carbon atoms, a fluorine-containing ester represented by the formula (IB):

wherein $Rf^3$ is an alkyl group which has 1 to 2 carbon atoms and may have fluorine atom, $Rf^4$ is an alkyl group which has 1 to 4 carbon atoms and may have fluorine atom, at least either $Rf^3$ or $Rf^4$ is a fluorine-containing alkyl group, the fluorine-containing chain carbonate represented by the formula (IC), and a fluorine-containing cyclic carbonate represented by the formula (ID):

wherein $X^1$, $X^2$, $X^3$ and $X^4$ are the same or different and each is hydrogen atom, fluorine atom or a fluorine-containing alkyl group which has 1 to 4 carbon atoms and may have fluorine atom, at least one of $X^1$ to $X^4$ is fluorine atom or a fluorine-containing alkyl group.

3. The lithium secondary cell of claim 1, wherein the other carbonate (II) is a non-fluorine-containing cyclic carbonate (IIA) and a non-fluorine-containing chain carbonate (IIB).

4. The lithium secondary cell of claim 3, wherein the non-fluorine-containing cyclic carbonate (IIA) is one of ethylene carbonate and propylene carbonate or a mixture thereof.

5. The lithium secondary cell of claim 3, wherein the non-fluorine-containing chain carbonate (IIB) is one of dimethyl carbonate, methyl ethyl carbonate and diethyl carbonate or a mixture thereof.

6. The lithium secondary cell of claim 1, wherein the fluorine-containing solvent (I) is the fluorine-containing ether represented by the formula (IA):

wherein $Rf^1$ is a fluorine-containing alkyl group having 3 to 6 carbon atoms, $Rf^2$ is a fluorine-containing alkyl group having 2 to 6 carbon atoms and/or the fluorine-containing cyclic carbonate represented by the formula (ID):

wherein $X^1$, $X^2$, $X^3$ and $X^4$ are the same or different and each is hydrogen atom, fluorine atom or a fluorine-containing alkyl group which has 1 to 4 carbon atoms and may have fluorine atom, at least one of $X^1$ to $X^4$ is fluorine atom or a fluorine-containing alkyl group.

7. The lithium secondary cell of claim 1, wherein when the total amount of (I) and (II) is assumed to be 100% by volume, the fluorine-containing solvent (I) is contained in an amount of 10 to 80% by volume and the other carbonate (II) is contained in an amount of 20 to 90% by volume.

8. The lithium secondary cell of claim 3, wherein when the total amount of (I), (IIA) and (IIB) is assumed to be 100% by volume, the fluorine-containing solvent (I) is contained in an amount of 10 to 80% by volume, (IIA) is contained in an amount of 10 to 50% by volume and (IIB) is contained in an amount of 10 to 80% by volume.

* * * * *